(12) United States Patent
Katsuda

(10) Patent No.: US 8,150,921 B2
(45) Date of Patent: Apr. 3, 2012

(54) APPARATUS, PORTABLE TERMINAL UNIT, AND SYSTEM FOR CONTROLLING E-MAIL, AND ITS METHOD, COMPUTER-READABLE RECORDING MEDIUM AND PROGRAM PRODUCT FOR PROCESSING E-MAIL

(75) Inventor: Takeo Katsuda, Tokyo (JP)

(73) Assignee: Minolta Co., Ltd., Osaka-Shi, Osaka (JP)

( * ) Notice: Subject to any disclaimer, the term of this patent is extended or adjusted under 35 U.S.C. 154(b) by 2230 days.

(21) Appl. No.: 09/880,039

(22) Filed: Jun. 14, 2001

(65) Prior Publication Data

US 2002/0059383 A1 May 16, 2002

(30) Foreign Application Priority Data

Jun. 19, 2000 (JP) .................................. 2000-183546

(51) Int. Cl.
G06F 15/16 (2006.01)
(52) U.S. Cl. ....................................................... 709/206
(58) Field of Classification Search ........... 709/204–207
See application file for complete search history.

(56) References Cited

U.S. PATENT DOCUMENTS

| | | | | |
|---|---|---|---|---|
| 5,493,692 A | * | 2/1996 | Theimer et al. | 455/26.1 |
| 5,548,789 A | * | 8/1996 | Nakanura | 709/206 |
| 6,092,114 A | * | 7/2000 | Shaffer et al. | 709/232 |
| 6,185,605 B1 | * | 2/2001 | Kowaguchi | 709/206 |
| 6,219,694 B1 | * | 4/2001 | Lazaridis et al. | 709/206 |
| 6,237,027 B1 | * | 5/2001 | Namekawa | 709/206 |
| 6,256,666 B1 | * | 7/2001 | Singhal | 709/217 |
| 6,275,848 B1 | * | 8/2001 | Arnold | 709/206 |
| 6,343,317 B1 | * | 1/2002 | Glorikian | 709/218 |
| 6,421,707 B1 | * | 7/2002 | Miller et al. | 709/206 |
| 6,463,464 B1 | * | 10/2002 | Lazaridis et al. | 709/207 |
| 6,466,232 B1 | * | 10/2002 | Newell et al. | 715/700 |
| 6,510,438 B2 | * | 1/2003 | Hasegawa | 707/104.1 |
| 6,571,279 B1 | * | 5/2003 | Herz et al. | 709/217 |
| 6,658,456 B1 | * | 12/2003 | Shimoosawa | 709/206 |
| 6,701,378 B1 | * | 3/2004 | Gilhuly et al. | 709/249 |
| 6,738,800 B1 | * | 5/2004 | Aquilon et al. | 709/206 |

(Continued)

FOREIGN PATENT DOCUMENTS

EP 0905635 A2 3/1999

(Continued)

OTHER PUBLICATIONS

Official Notice of Reason for Refusal in corresponding Japanese Patent Application No. 2000-183546 and an English-language translation, dated Feb. 2, 2010, 8 pages.

*Primary Examiner* — Larry Donaghue
(74) *Attorney, Agent, or Firm* — Buchanan Ingersoll & Rooney PC

(57) ABSTRACT

The E-mail server of the invention receives E-mail addressed to a portable terminal unit, and transmits receipt notice E-mail prepared by removing the attachment file portion of the received E-mail to the portable terminal unit. On the other hand, the E-mail server acquires the location information of the portable terminal unit. The E-mail server selects a device among multiple printers and facsimile devices according to the acquired location information. The E-mail server transmits the data corresponding to the attachment file portion to the selected device.

26 Claims, 18 Drawing Sheets

U.S. PATENT DOCUMENTS 6,779,019 B1 * 8/2004 Mousseau et al. ............ 709/206
6,801,962 B2 * 10/2004 Taniguchi et al. ............ 710/33

FOREIGN PATENT DOCUMENTS

| | | |
|---|---|---|
| JP | 7-212395 | 8/1995 |
| JP | 09-098475 | 4/1997 |
| JP | 09-233232 | 9/1997 |
| JP | 09-331352 | 12/1997 |
| JP | 10-056522 | 2/1998 |
| JP | 10-191453 | 7/1998 |
| JP | 10-222527 | 8/1998 |
| JP | 11-088414 | 3/1999 |
| JP | 11-187126 | 7/1999 |
| JP | 11-212884 | 8/1999 |
| JP | 11-345182 | 12/1999 |
| JP | 11-355498 | 12/1999 |
| JP | 2000-13431 | 1/2000 |
| JP | 2001-306469 | 11/2001 |
| JP | 2001-358754 | 12/2001 |
| JP | 2002007280 | * 11/2002 |

* cited by examiner

MAIL "C"

MAIL "A"

MAIL "B"

FIG.12

| CONTROL NO. | LOCATION | POSITION | | TELEPHONE NUBER | IP ADDRESS |
|---|---|---|---|---|---|
| | | LATITUDE | LONGTUDE | | |
| 1 | SHOP A | 30.0101 | 135.0101 | 123456789 | |
| 2 | BRANCH A | 30.0101 | 135.0101 | | 200.200.200 |
| 3 | SHOP B | 30.0101 | 135.0101 | 987654321 | |
| ... | ... | ... | ... | ... | ... |
| N | BRANCH B | 40.0101 | 145.9999 | 5555555555 | |

41 — FROM : USER A
42 — TO : SERVER A
43 — SUBJECT RE : ATTACHMENT #1

> FROM : USER B
> TO : USER A
> SUBJECT : HELLO
>
>ATTACHEMENT : HELLO.PDF
>ID : #1
> IMAGE : OK

⎫
⎬ 44
⎭

RETURN MAIL "RE:C"

FIG.21

41 — FROM : USER A
42 — TO : SERVER A
43 — SUBJECT RE : ATTACHMENT #1

> FROM : USER B
> TO : USER A
> SUBJECT : HELLO
>
>ATTACHMENT : HELLO.PDF
>ID : #1
45 — > IMAGE : OK
⌐ ─ ─ ─ ─ ─ ─ ─ ─ ┐
│ 03-0000-0000 │
└ ─ ─ ─ ─ ─ ─ ─ ─ ┘

} 44

RETURN MAIL "RE:C"

APPARATUS, PORTABLE TERMINAL UNIT, AND SYSTEM FOR CONTROLLING E-MAIL, AND ITS METHOD, COMPUTER-READABLE RECORDING MEDIUM AND PROGRAM PRODUCT FOR PROCESSING E-MAIL

This application is based on the Japanese Patent Application No. 2000-183546 filed on Jun. 19, 2000, the contents of which are hereby incorporated by reference.

BACKGROUND OF THE INVENTION

1. Field of the Invention

The present invention relates to an apparatus and a portable terminal unit for controlling E-mail, and its method, a computer-readable recording medium and a program product for processing E-mail.

2. Description of the Related Art

The technology of attaching a file prepared by various applications to E-mail and sending it is also well known.

In general, there is a limit in the size of data which a portable terminal unit can receive and store. Therefore, it is difficult to receive E-mail attached with a large file. In order to solve these problems, a technology has been proposed as disclosed in EPA0905635, which allows, in case of E-mail attached with a file, the E-mail from which the attachment file portion is deleted to be send to the destination corresponding to a portable terminal unit, while sending the data that corresponds to the attachment file to a pre-registered facsimile device to be outputted there.

However, the technology disclosed by the above-mentioned publication causes the following problems, as it requires the information such as the telephone number of the facsimile device that is intended to output images that correspond to the attachment file is pre-registered.

Since an image output device to output a portion of the E-mail is fix in advance, it is necessary for the user who is carrying a portable terminal unit to go to the fixed device in order to verify the contents of the attachment file. It is also necessary for the user to reregister the telephone number that identifies the device in case of changing the output device to which the data such as attachment file portion is to be outputted. Therefore, it is difficult for the user to change the image output device when the user is out of the office. Moreover, it is difficult for the user to know stores and other institutions where a facsimile device and/or a printer are installed that can be used as output devices.

SUMMARY OF THE INVENTION

It is an object of the invention to provide an apparatus and a portable terminal unit for controlling E-mail and, a system and its method, computer-readable recording media and computer program product for processing E-mail that allow to automatically select a image output devices to which the content of E-mail can be outputted depending on the location of the destination of the E-mail.

It is another object of the invention to provide an E-mail control apparatus that reduces the operating burden of the user in changing the image output device.

According to an aspect of the invention, an E-mail controlling apparatus has an E-mail receiving device receiving E-mail addressed to a certain destination, an E-mail preparing device preparing receipt notice E-mail based on the E-mail received by the E-mail receiving device, an E-mail transmitting device transmitting the receipt notice E-mail prepared by the E-mail preparing device to the destination, a location information acquiring device acquiring location information of the destination, a selecting device selecting one of multiple image output devices on the basis of the location information acquired by the position acquiring device, and a data transmitting device transmitting at least a portion of the data of the E-mail received by the E-mail receiving device to the image output device selected by the selecting device.

According to another aspect of the invention, a portable terminal unit has a receiving device receiving E-mail from an e-mal controlling apparatus, a detecting device detecting the location of said portable terminal unit, and an acquiring device acquiring the data that indicates an image output device selected on the basis of the location detected by said detecting device.

According to still another aspect of the invention, an E-mail processing method has the step of receiving E-mail addressed to a certain destination, the step of preparing receipt notice E-mail based on the received E-mail, the step of transmitting the receipt notice E-mail to the destination, the step of acquiring location information of the destination, the step of selecting one of multiple image output devices on the basis of the location information of the destination acquired, and the step of transmitting at least a portion of the data of the received E-mail to the image output device selected.

The invention obtains the location information of the destination of the E-mail and selects an image output device that is most suitable for outputting images from multiple choices of image output devices based on the location information of the acquired portable terminal unit. Therefore, as the user carrying the portable terminal unit that corresponds to the destination of E-mail moves, an image output device, to which a portion of the E-mail is outputted as an image, is automatically selected, so that the user can confirm the contents of the E-mail at the nearby image output device. Moreover, the user can easily know the location of the image output device.

BRIEF DESCRIPTION OF THE DRAWINGS

FIG. 12 is a diagram showing a table of registered location information of each image output device.

FIG. 21 is a schematic diagram showing reply mail to the receipt notice E-mail shown in the second embodiment.

DESCRIPTION OF THE PREFERRED EMBODIMENTS

The preferred embodiments of the present invention are described below with reference to the accompanying drawings.

Embodiment 1

Figure 1:
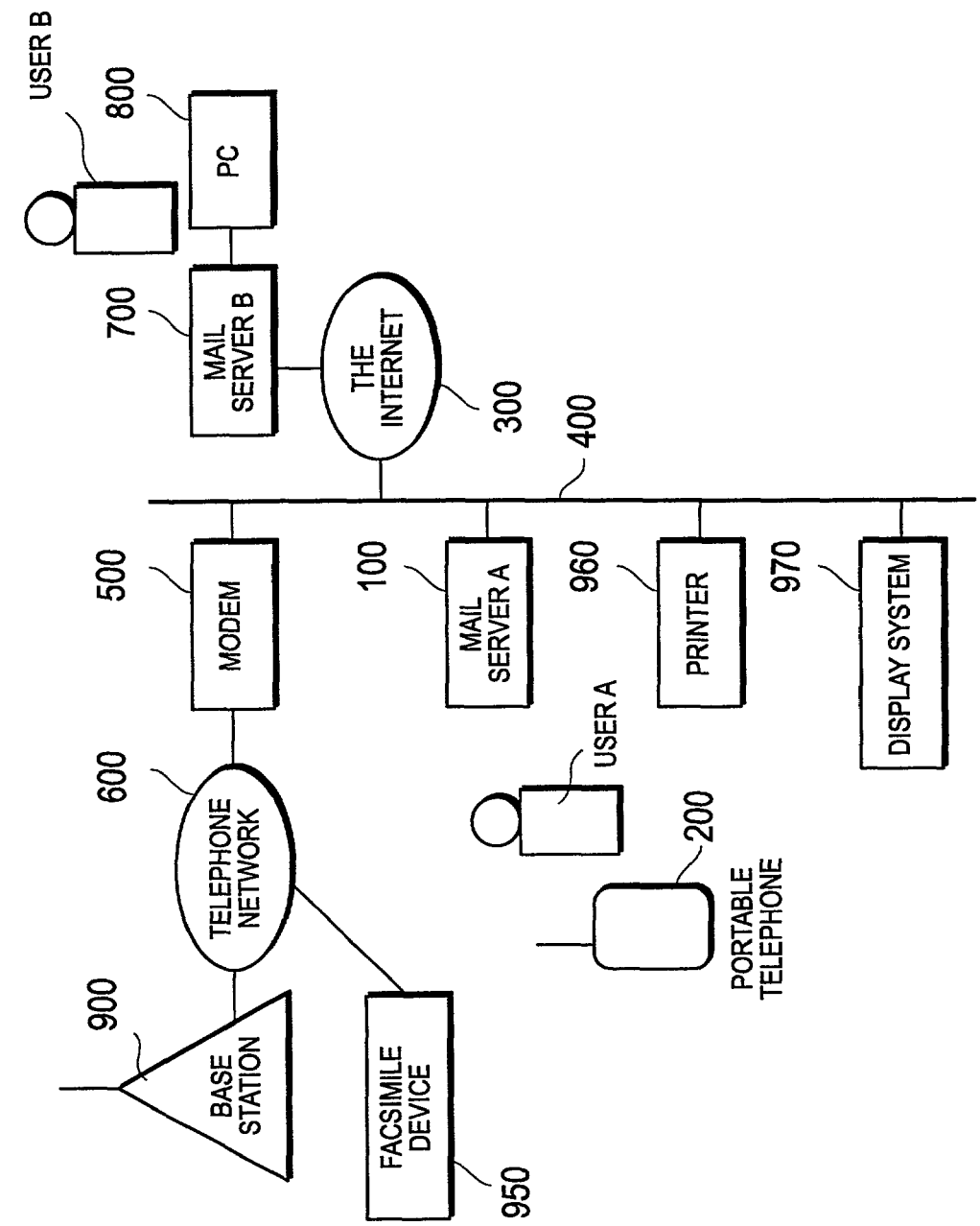
FIG. 1 is a drawing showing a network environment, in which an E-mail server corresponding to the E-mail control apparatus of the invention operates.

FIG. 1 is a drawing showing a network environment, in which an E-mail server corresponding to the E-mail controlling device of the invention operates.

An E-mail server 100 (mail server "A") exchanges E-mail, in particular, The Internet mail, with a portable telephone 200. In other words, the mail server 100 is a mail server for portable telephones.

The mail server 100 is connected to a network 400. The network 400 includes the Internet 300 and/or a LAN not shown. The mail server 100 is communicably connected with another mail server 700, a client computer ("PC") 800, a printer 960, and a display system 970 via a network 400.

On the other hand, the mail server 100 is also connected to a telephone network 600 as well via a modem 500. The telephone network 600 is connected with a facsimile device 950 and a base station (wireless station) 900 for portable telephone.

The wireless communication between the portable telephone unit 200 and the base station 900 establishes a condition that enables the portable telephone 200 to communicate with other telephone sets. The portable telephone 200 also has a constitution to exchange E-mail. More specifically, the portable telephone 200 receives E-mail that has been accumulated in the mail server 100, which has been transmitted from the other mail server 700.

The actual system can have a constitution more complex than the one shown in FIG. 1. For example, the telephone network 600 may contain a conventional telephone network where stationary devices such as a facsimile device 950 are connected and a telephone network for portable telephones. The telephone network 600 may be divided into a circuit-switching network for voice communications and a packet-switching network for exchanging E-mail, etc. The connection between the mail server 100 and the telephone network 600 can be done by means of a digital service unit (DSU) or a terminal adapter (TA) instead of a modem 500.

Figure 2:
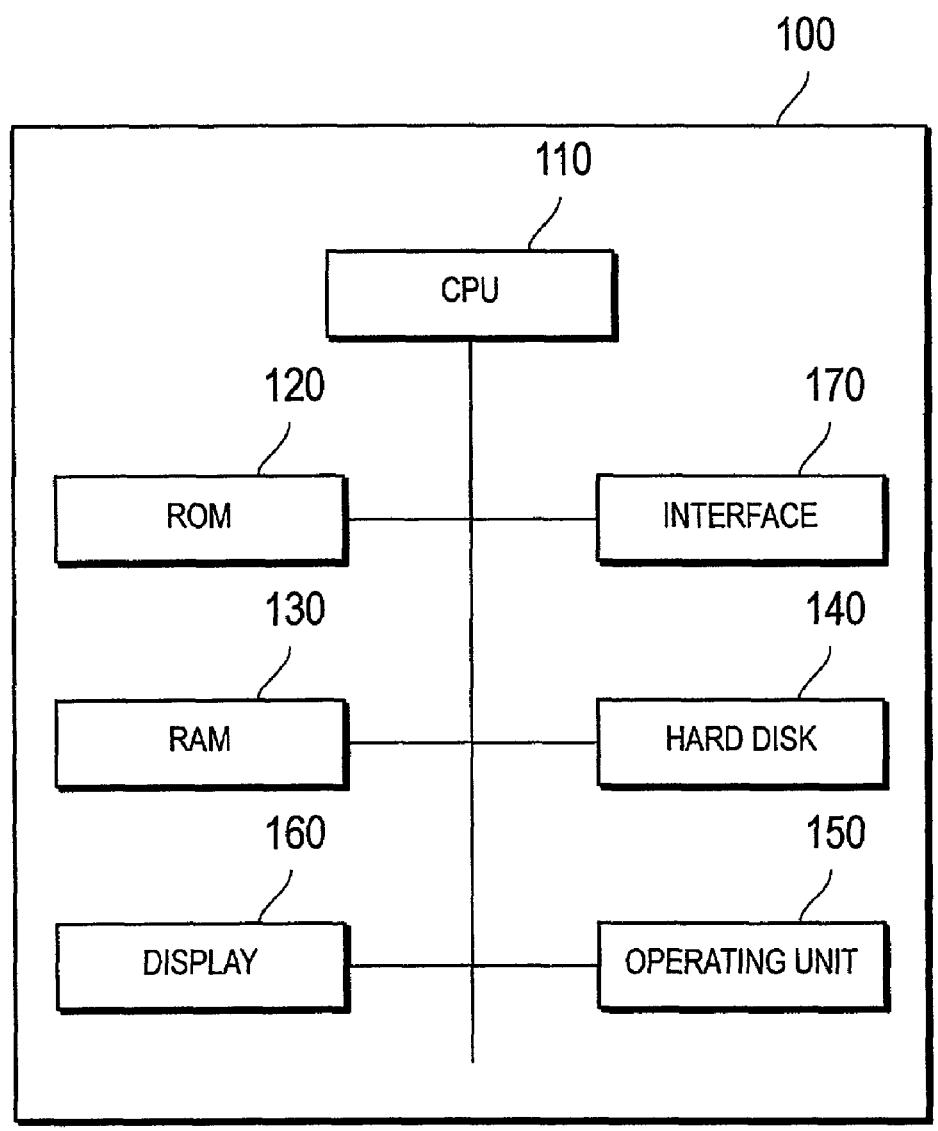
FIG. 2 is a block diagram showing the constitution of the E-mail server of the first embodiment.

FIG. 2 is a block diagram showing the schematic constitution of the mail server 100 of this embodiment. The mail server 100 is a computer such as an engineering workstation and a personal computer. The mail server 100 has a CPU 110, a ROM 120, a RAM 130, a hard disk 140, an operating unit 150, a display 160, an interface 170.

The CPU 110 executes the process of the mail server 100 according to the program. The ROM 120 stores various programs. The RAM 130 has an area to store data temporarily. The hard disk 140 stores execution programs such as application programs. The operating unit 150 comprises a keyboard or a mouse for inputting data and instructing operations. The display 160 performs various displays concerning the mail server 100.

The interface 170 has a communication interface function for exchanging data and control signals with the other mail server 700, the printer 960, and a digital copying machine (not shown) based on IP addresses. The interface 170 also has an interface function between itself and the telephone network 600 for processing calls to the facsimile device 950 based on its telephone number to perform facsimile communication.

Figure 3:
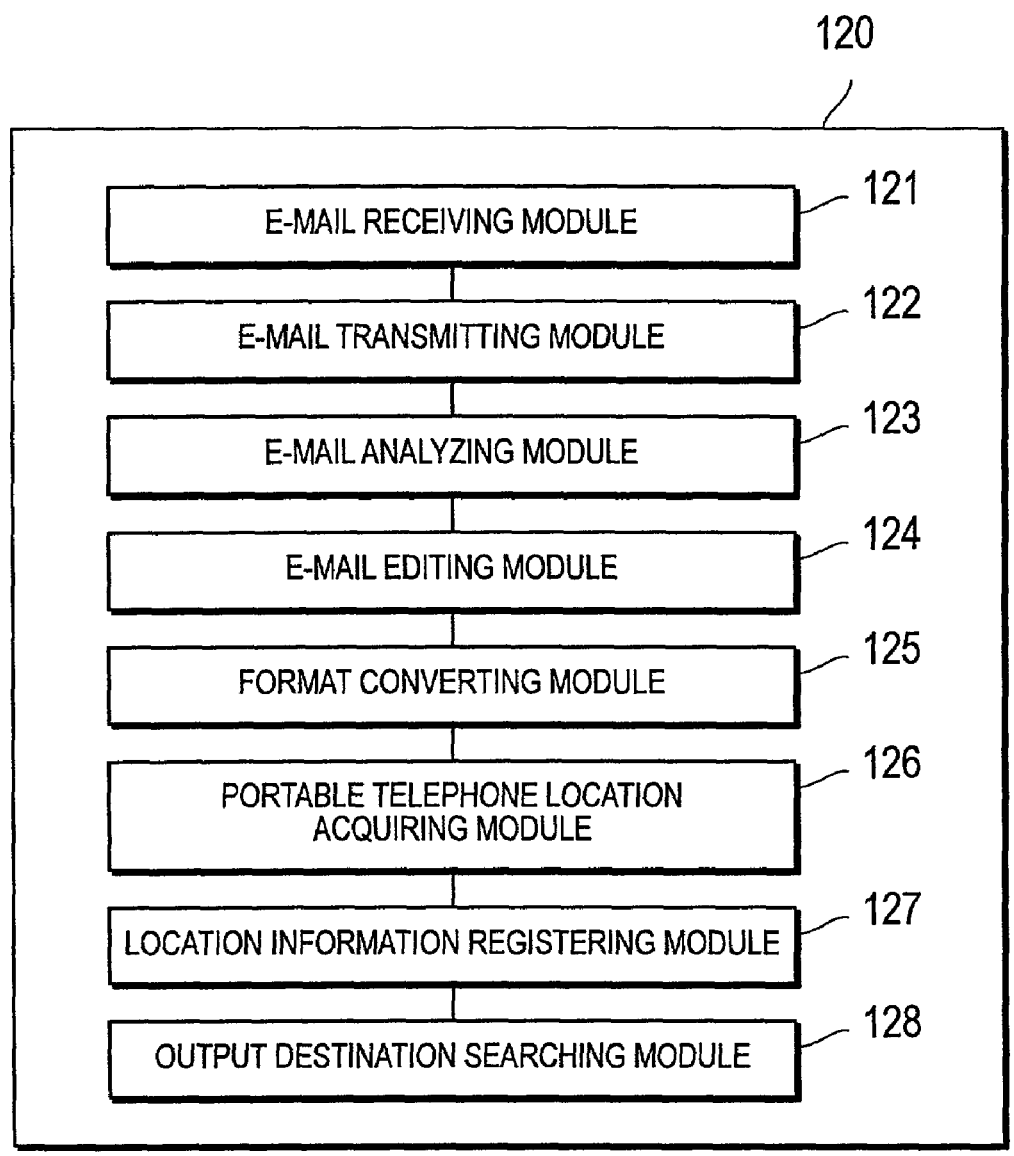
FIG. 3 is a block diagram used for describing each function of the program executed by the E-mail server shown in FIG. 2.

FIG. 3 is a conceptual diagram for describing various functions of execution programs stored in memory units, i.e. the ROM 120 and/or the hard disk. The process of this mail server 100 is executed according to the execution program.

An E-mail receiving module 121 and an E-mail sending module 122 are software for receiving and sending E-mail according to the conventional protocol similar to an existing mail server. For example, the sending (transferring) of E-mail is executed according to the mail transferring protocol such as the SMTP (Simple mail Transfer Protocol). Also, in order to read out E-mail on the mail server, protocols such as the POP 3 (Post Office Protocol 3) and the IMAP 4 (Internet Message Access Protocol 4) are used. This invention can be applied regardless of the type of protocols used.

An E-mail analysis module 123 is software for judging whether E-mail received from another mail server has any attachment files and extracting the attachment files. Moreover, the E-mail analysis module 123 extracts the instruction parts of telephone numbers and IP addresses contained in the E-mail.

An E-mail editing module 124 is software for preparing receipt notice E-mail based on the portion other than the attachment file portion ("main text portion") of received E-mail. Specifically, the receipt notice E-mail is prepared by removing the attachment file portion from the received E-mail and adding the fact that the attachment file portion is removed as well as the name and type of the attachment file that is removed.

A type conversion module 125 is software for converting E-mail (particularly, the attachment file part) into a format that can be outputted by the selected image output device. The image output device here included the facsimile device 950, the printer 960 and the display system 970.

A portable telephone position acquisition module 126 is software for acquiring the current location of the portable telephone 200 for receiving E-mail via the network 400 and/or the telephone network 600. The specific process for acquiring the location information will be described later. A location information registration module 127 is software for registering and storing the location information of multiple image output devices by device.

An output search module 128 is software for data searching by collating the location information of the portable telephone 200 obtained by the portable telephone position acquisition module 126 with the location information registered by the location information registration module 127. In other words, the output search module 128 is software for selecting the image output device, to which the entire E-mail received by the mail server 100 and/or the data that corresponds to the attachment file.

The CPU 110 executes actual processes according to the programs described above. However, each program module does not have to be executed by one computer, but rather can be executed by multiple computers, i.e., multiple CPUs.

Next, the processing according to the E-mail controlling system of the present embodiment is described below.

The E-mail controlling system according to the current embodiment includes the E-mail server, portable telephones, and an image output device. The E-mail controlling system performs the process as described below. The description is based on an example where electronic mal is transmitted to the portable telephone 200 from the PC 800.

Figure 4:
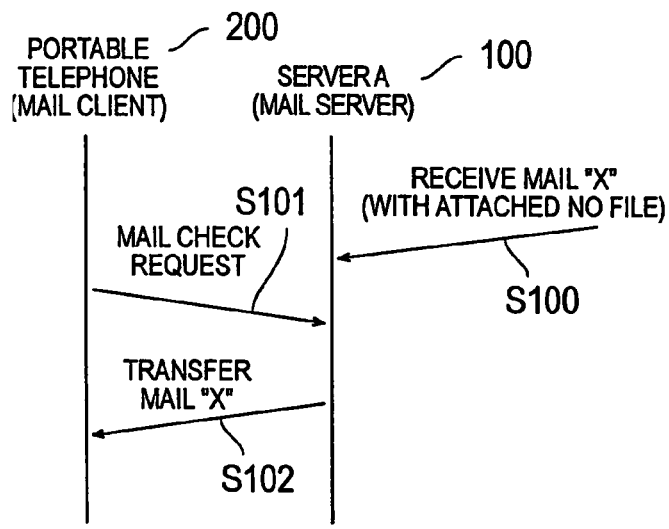
FIG. 4 is a sequence chart showing the operation according to the system containing the E-mail server shown in FIG. 2 when no attachment file is contained in E-mail.

FIG. 4 is a sequence chart showing the operation by the E-mail controlling system when no attachment file is contained in E-mail.

At the step S100, the E-mail "x" is transmitted to the mail server 100. The mail server 100 stores the E-mail "x" in the mailbox temporarily. At the step S101, a request for checking received mail ("mail check request") is transmitted from the portable telephone 200 to the mail server 100. At the step S102, in response to the mail check request, the mail server 100 transmits the E-mail "x" to the portable telephone 200. The processing for a case where no file is attached to E-mail is similar to the process performed on a conventional E-mail server.

Figure 5:
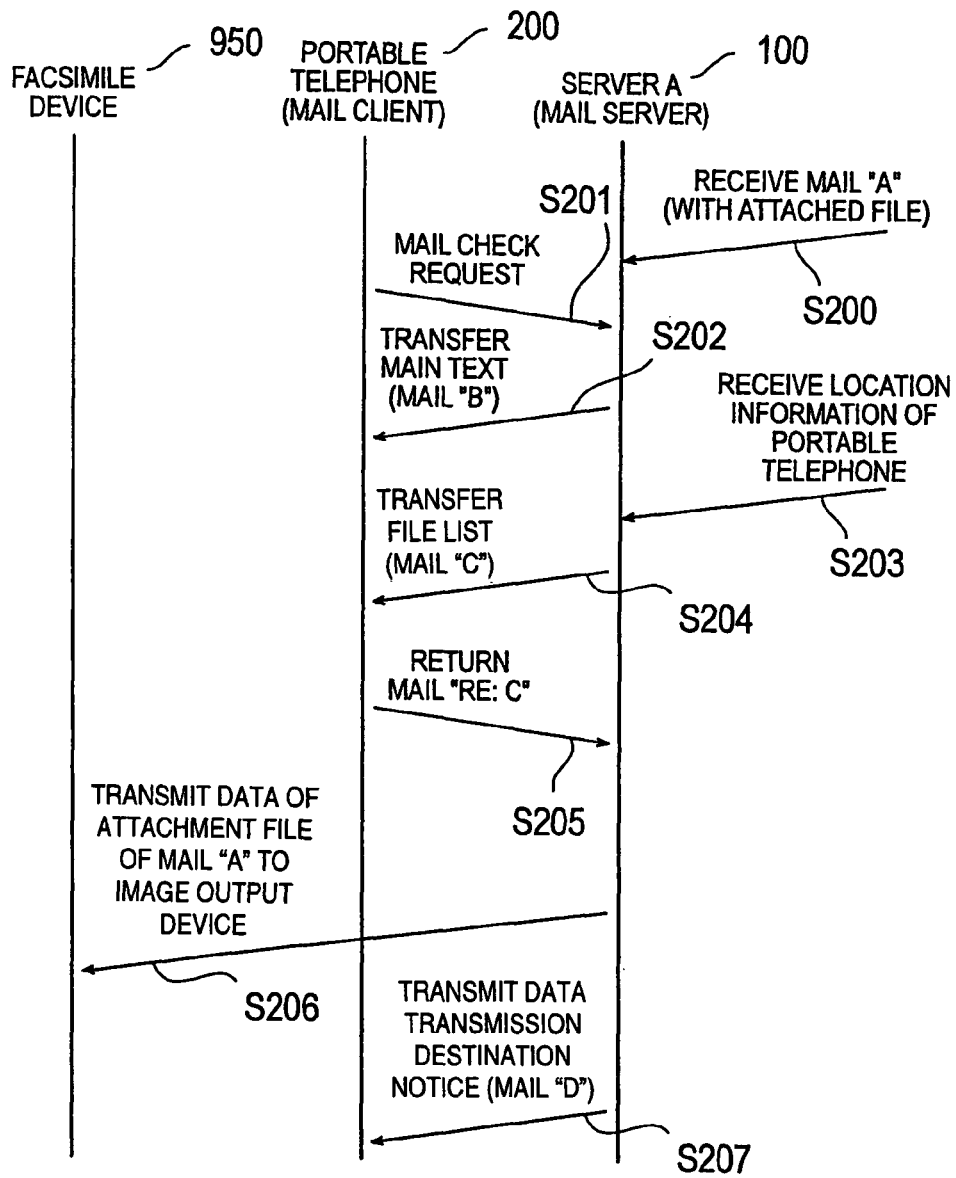
FIG. 5 is a sequence chart showing the operation according to the system containing the E-mail server shown in FIG. 2 when an attachment file is contained in E-mail.

FIG. 5 is a sequence chart showing the operation by the E-mail controlling system when an attachment file is contained in E-mail.

At the step S200, the mail server 100 receives E-mail "a" addressed to a certain portable telephone 200. The E-mail "a" is stored at the mailbox of the mail server 100 temporarily.

At the step S201, the mail check request is transmitted by the portable telephone 200 to the mail server 100. The mail check request can be made any time by the user operating a receive button (not shown) on the portable telephone 200. It can be so configured that the E-mail be transmitted to the portable telephone 200 automatically without waiting for the user's operation.

At the step S202, the receipt notice E-mail "b" prepared based on the main text portion of the E-mail "a" received by the mail server 100 at the step S200 is transmitted out to the portable telephone 200.

At the step S203, the mail server 100 acquires the location information of the portable telephone 200 via the network 400 and/or the telephone network 600. Further, the mail server 100 selects the image output device which is located closest to the location of the portable telephone 200 among multiple image output devices whose location information is stored in the RAM 130 based on the acquired location information. The process will be described using a case where the facsimile device 950 is the image output device closest to the portable telephone 200 as an example.

At the step S204, the mail server 100 prepares a receipt notice E-mail "c" that contains the list of attachment files removed at the step S202. The mail server 100 transmits the prepared receipt notice E-mail "c" to the addressed portable telephone 200.

At the step S205, a reply mail "Re: c" to the receipt notice E-mail "c" received from the mail server 100 is retuned from the portable telephone 200 to the mail server 100. If the user desires to have the data corresponding to the attachment file portion to be outputted as an image at the image output device, the reply mail "Re: c" will be returned by the portable telephone 200.

At the step S206, the attachment file portion is converted into a data format that can be outputted by the facsimile device 950 selected at the step S203. The attachment file portion, the data format of which is converted, is transmitted to the facsimile device 950 via the telephone network 600.

At the step S207, the mail server 100 notifies the user by an E-mail "d" transmitted by the mail server 100 to the portable telephone 200 that the attachment file portion has been transmitted to the facsimile device 950.

Next, the operation of the electronic mail server 100 corresponding to the first embodiment is described below.

Figure 6:
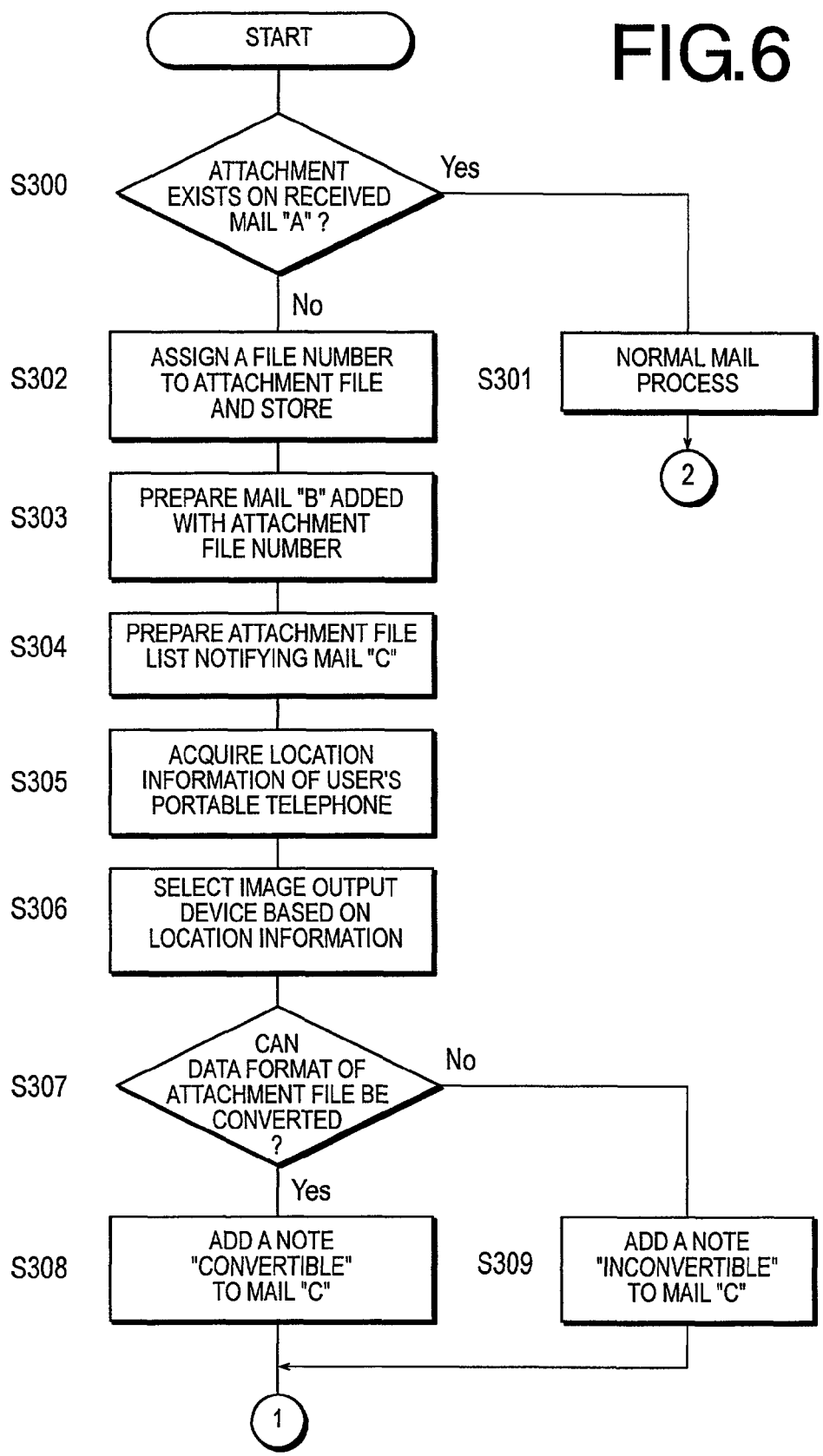
FIG. 6 is a flow chart showing the operation of the E-mail server corresponding to a first embodiment.
Figure 7:
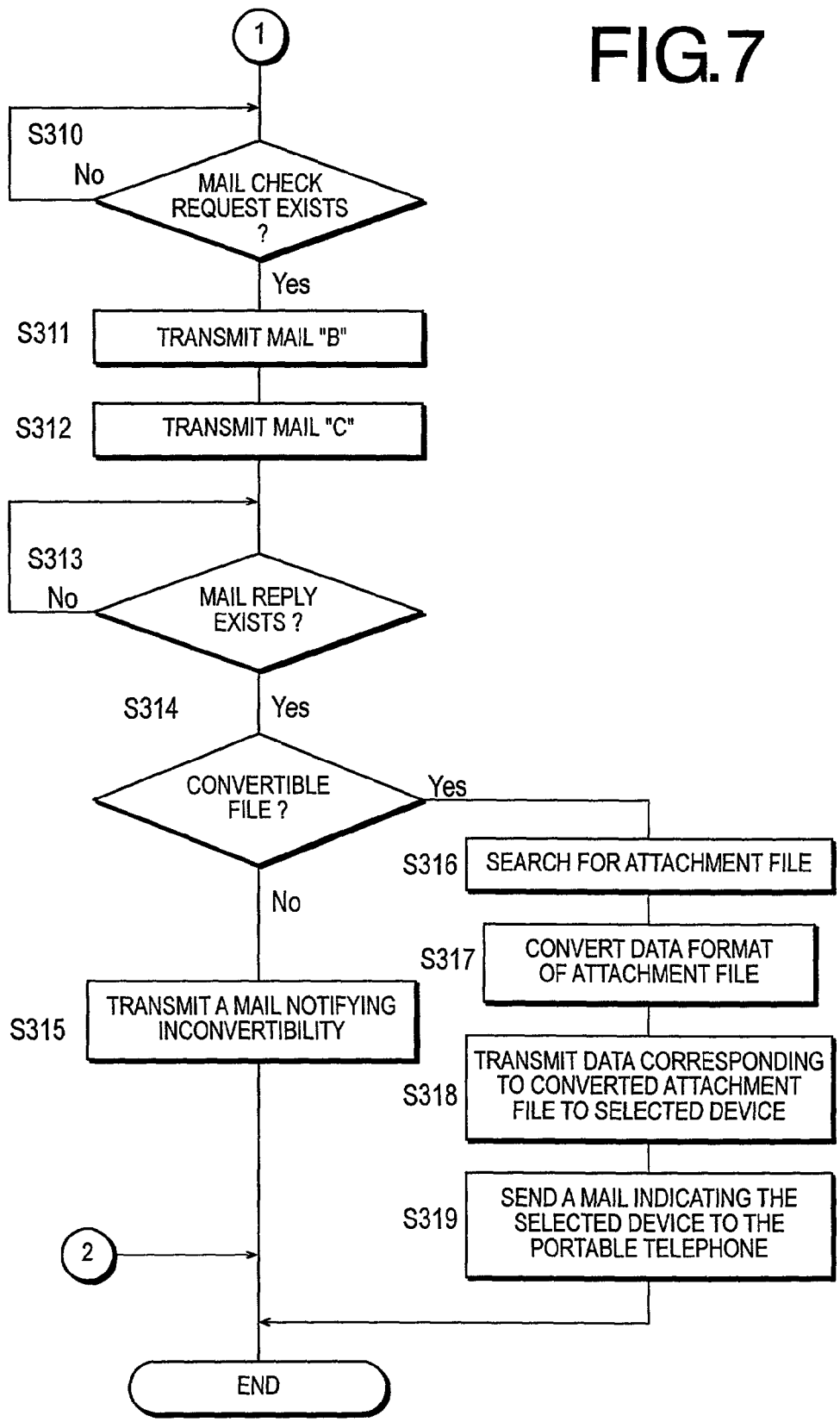
FIG. 7 is a flow chart that follows the flowchart shown in FIG. 6.

FIG. 6 and FIG. 7 are flowcharts showing the operation of the E-mail server 100 corresponding to a first embodiment. The algorithm shown in the flowcharts of FIG. 6 and FIG. 7 is stored in the ROM 120 or the hard disk 140 as a program and executed by the CPU 110.

At the step S300, the mail server 100 receives the E-mail "a" addressed to the portable telephone 200 and makes a judgment whether the E-mail "a" contains the attachment file portion. If the E-mail "a" does not contain the attachment file portion, the process of the step S301 is executed. If the E-mail "a" contains the attachment file portion, the process of the step S301 is skipped.

Figure 8:
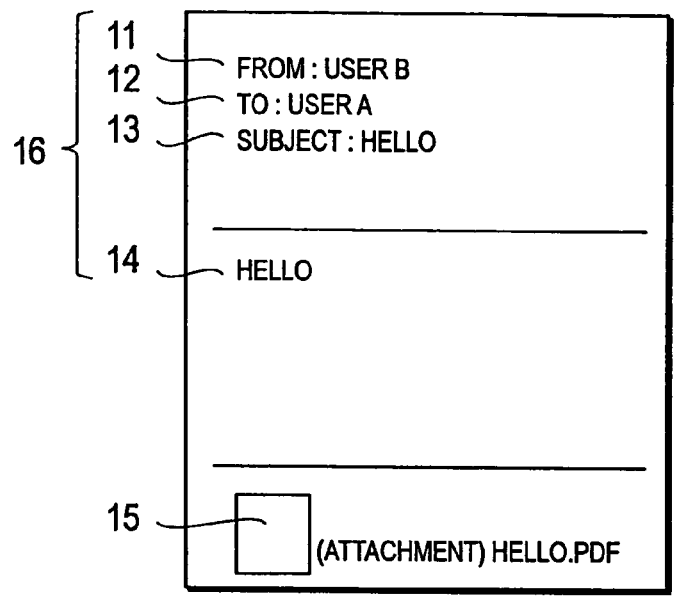
FIG. 8 is a schematic diagram showing typical E-mail that is received by the E-mail server.

FIG. 8 is a schematic diagram showing the E-mail "a" received by the E-mail server. The E-mail "a" contains a main text portion 16 and an attachment file portion 15. The main text port 16 consists of a header portion and a text portion 14. The header portion included, a mail address 11 of the user (user "b") who is sending the E-mail, a mail address 12 of the user (user "a"), which corresponds to the address of the E-mail, and a subject title 13.

At the step S301 shown in FIG. 6, the normal E-mail process is executed to complete the process.

At the step S302, the file number (file name) is added to the attachment file portion 15. The attachment file portion 15 is stored in the RAM 130 or the hard disk 140. Specifically, the attachment file portion 15 is extracted from the E-mail "a." Binary files such as image files are often attached by being coded as text data using specified formats, i.e., MIME (multipurpose Internet mail extensions). At the step S302, therefore, the decoding of the attachment file portion 15 is conducted, and the attachment file portion 15 is returned to the original binary file. The file number will be stored related to the address of the E-mail "a." After the above process, the attachment file portion is removed from the E-mail "a."

At the step S303, a receipt notice electronic mail is prepared by adding a statement that there was an attachment file to the main text portion 16 of the E-mail "a," from which the attachment file portion has been removed. The file number of the attachment file, which is removed, can be added to the main text portion of the E-mail.

Figure 9:
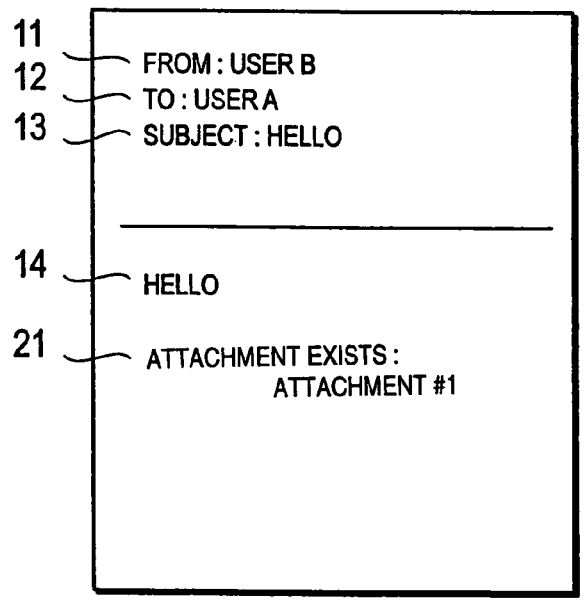
FIG. 9 is a schematic diagram showing a receipt notice E-mail that is transmitted from the E-mail server to a portable telephone.

FIG. 9 is a schematic diagram showing the receipt notice E-mail "b" that is transmitted from the E-mail server to a portable telephone. The receipt notice E-mail "b" is prepared based on the main text portion 16 of the E-mail "a." Specifically, the receipt notice E-mail "b" is prepared by removing the attachment file portion 15 from the E-mail "a" and adding the attachment file number 21 to the main text portion to indicate that there was an attachment file.

At the step S304, the E-mail "c" for providing the list of removed files is prepared. The E-mail "c" is also one of the receipt notice E-mails that are prepared based on the received E-mail "a."

Figure 10:
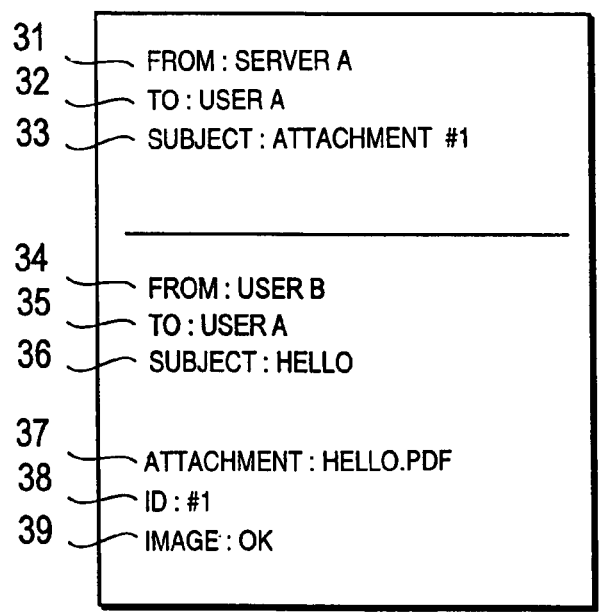
FIG. 10 is a schematic diagram showing a receipt notice E-mail attached with a file list that is transmitted from the E-mail server to a portable telephone.

An example of the receipt notice E-mail "c" is shown in FIG. 10. The header portion of the receipt notice E-mail "c" contains the address of the mail server 100 as an E-mail sender mail address information 31. The header portion contains a mail address 32, which indicates the addressee of the E-mail and a subject tile 33. Moreover, the contents of the original E-mail "a", i.e., the items 34 through 36 can be added to the receipt notice E-mail "c. " The contents of the original E-mail "a" include the information on the user b, who is the sender of the E-mail "a" received by the mail server 100.

The receipt notice E-mail "c" includes the list 37 of the file name of the attachment file, which has been removed. Moreover, the receipt notice E-mail "c" includes the identification (ID) 38. Different from the format of the present embodiment, it is possible to send the receipt notice E-mail "c" only, and skip the sending of the receipt notice E-mail "b." In other words, it is possible to adopt a constitution not to transmit the receipt notice E-mail twice.

At the step S305, the information on the current location of the portable telephone 200 that the user "a" is carrying is acquired via the network 400 and/or the telephone network 600. In order to acquire the location information of the portable telephone 200, the conventional technology, which already exists as one of the telephone-services and notifies contract users of the location information of the portable telephone 200, is used.

Figure 11:
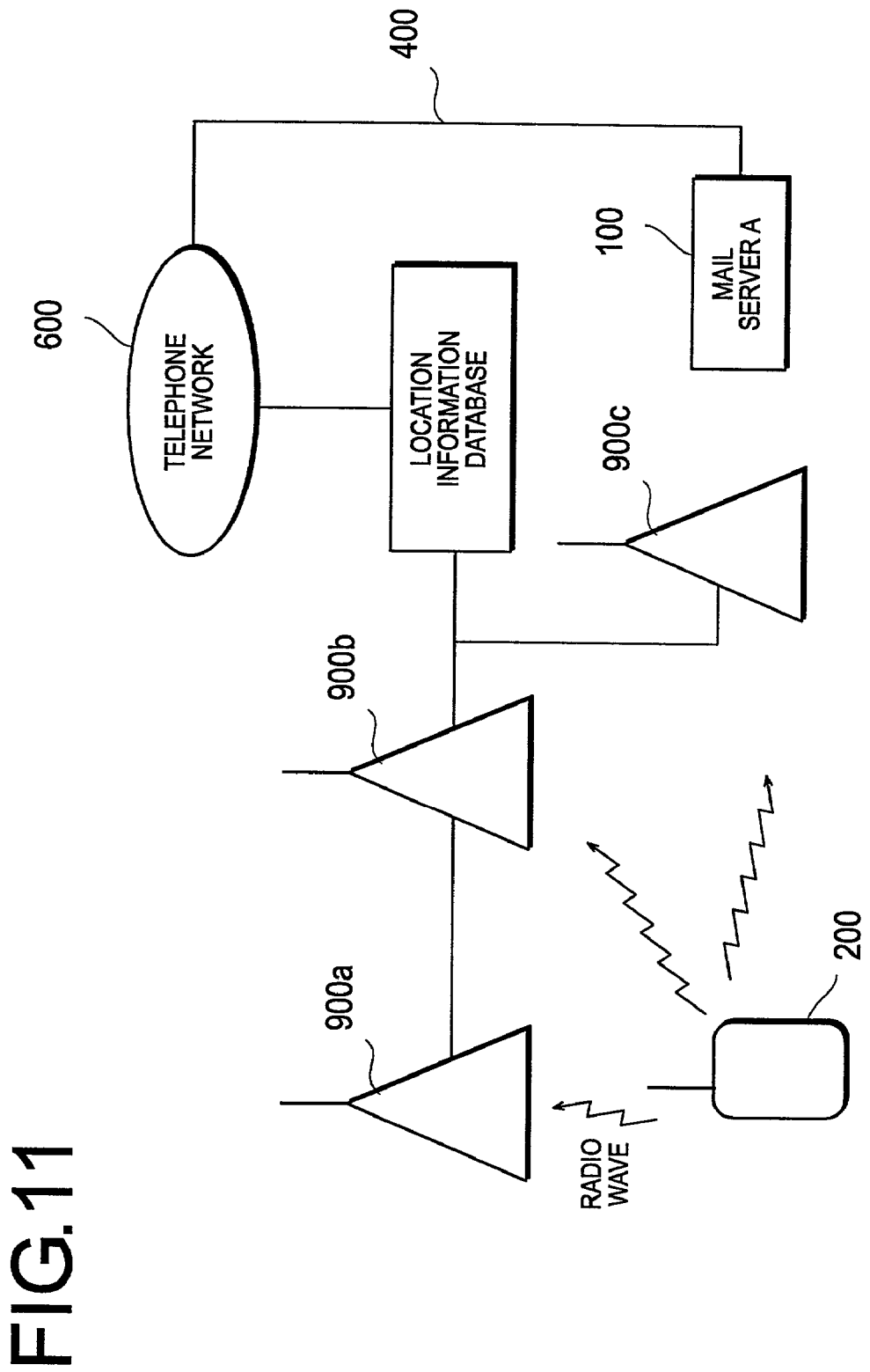
FIG. 11 is a diagram showing an example constitution for obtaining the location information of a portable telephone.

FIG. 11 is an example of a constitution for obtaining the location information of portable telephones. In this diagram, items 900a, 900b, and 900c are all base stations. Each base station is connected to the mail server 100 via a location information database and the telephone network 600. The location information database has location information of each base station.

The portable telephone 200 communicates with the station 900a, which gives the strongest electric field intensity among the multiple base stations 900a through 900c. As a consequence, the location information of the portable telephone 200 is calculated based on the location information of the base station 900a. Moreover, if the portable telephone 200 can communicate with the base stations 900a and 900b, the location of the portable 200 can be calculated within an error range of less than 50 meters based on the location information of the base stations 900a and 900b and the electric field intensity information, which is the radio wave receiving level of each of these base stations. The mail server 100 acquires the information of the current location of the portable telephone 200 via the telephone network 600 thus calculated.

At the step S306 shown in FIG. 6, the image output device, to which the content of the attachment file is to be outputted (printed or displayed) as an image, is selected according to the location information acquired at the step S305. The location information of the facsimile device 950, the printer 960, and the display 970 is stored in the RAM 130 in advance as a table individually.

FIG. 12 is a diagram showing a table of location information registered by each image output device. For example, the location information expressed in the latitude and the longitude is stored in relation to the telephone number or the IP address of each device. Moreover, the name of the shop where each device is located or the place of installation can be stored in the table. It is also possible to have the information related to the contents of the service each device can offer, e.g., whether it can produce color printing ("service information"), be stored in relation to the location information.

The selection process of the image output device is executed by comparing the location information of the portable telephone 200 acquired at the step S305 in FIG. 6 and the location information stored in advance in the RAM 130 a shown in FIG. 12. Consequently, the facsimile device 950 that has the location information closest to the location information of the portable telephone 200 is detected.

At the step S307 shown in FIG. 6, a judgment is made whether the attachment file portion can be converted into a format that can be outputted by the selected image output device. This judgment is executed, for example, by identifying the type of extension of the attachment file temporarily stored at the step S302. More specifically, multiple extensions that correspond to the types of files that can be converted into the types that can be image-outputted by each image output device are registered in advance. The extension of the identified attachment file is compared and collated with these multiple registered extensions. The above judgment is made according to the result of this comparison.

If the format of the attachment file can be converted (S307: yes), the process of the step S308 is executed. If it cannot be converted (S307: No), the process of the step S308 is skipped. More specifically, it is preferable that a format conversion module 125 is provided to be able to convert the word processing text files, PDF files, data files of the JPEG or TIFF formats, and spreadsheet calculation software into formats acceptable to the image output device.

At the step S308, a statement that it is possible to convert the item into a format that can be outputted at the output destination based on the judgment result at the step S307, i.e., it is possible to output images at the output destination, is displayed on the main text portion of the receipt notice E-mail "c."

At the step S309, a statement that it is impossible to convert the item into a format that can be outputted at the output destination based on the judgment result at the step S307, i.e., it is impossible to output images at the intended image output device, is displayed on the main text portion of the receipt notice E-mail "c."

It is also possible to constitute the system in such a way as to keep finding image output devices located next closest to the portable telephone 200 one after the other, if it is impossible to convert the item into a format that can be outputted at the image output device closest to the portable telephone 200 selected at the step S306. It is also possible to execute the process of the step S309 only if all the potential image output devices are checked repeating the above process without finding a device for which the attachment file portion can be converted into the format that allows outputting.

At the step S310 of FIG. 7, a judgment is made whether the request for receipt of mail is received from the portable telephone unit 200. When the request for receipt of mail is received, the processes of the step S311 and the step S312 are executed. At the step S311, the receipt notice E-mail "b" is transmitted to the portable telephone 200. At the step S312, the receipt notice E-mail "c" is transmitted to the portable telephone 200.

At the step S313, a judgment is made whether the reply mail "Re: c" to the receipt notice E-mail c" from the portable telephone 200 is received. If the reply mail "Re: c" has not been received (S313: No), it executes the process of waiting until the reply mail is received. If the reply mail "Re: c" has been received (step S313: Yes), it executes the step S314.

Figures 13, 14:
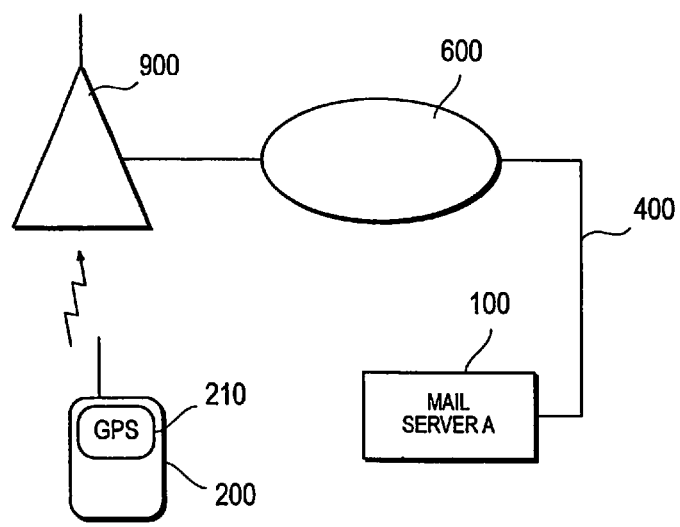
FIG. 13 is a schematic diagram showing reply mail to the receipt notice E-mail shown in FIG. 10.
FIG. 14 is a diagram showing an example constitution for obtaining the location information of a portable telephone using the GPS.

An example of the reply mail "Re: c" is shown in FIG. 13. The header portion includes the mail address of the user "a" of the portable telephone 200 as the mail address 41, from which the reply mail is being transmitted, as well as the address of the mail server 100 as the mail address 42, to which the reply mail is to be transmitted. The text portion 44 includes the content of the receipt notice E-mail "c." Since the mail server itself transmits the receipt notice E-mail "c" in advance to the portable telephone 200, the user can simply return the reply mail "Re: c" using the reply function of the receipt notice E-mail "c" received by the portable telephone 200.

At the step S314 of FIG. 7, it is reconfirmed whether the attachment file that corresponds to the reply mail "Re: c" is format convertible. The confirmation is executed by detecting the identification ID 38 written on the reply mail "Re: c," and collating it with the attachment file number. If, as the result of the confirmation, it is found that the reply mail "Re: c" is not related to a data convertible attachment file (S314: No), it is possible that the user "a" made a mistake in sending the replay mail "Re: c," so that the process of the step S315 is executed. On the other hand, if the reply mail "Re: c" is related to a convertible attachment file (S314: Yes), the process of the step S316 is executed.

At the step S315, the mail server 100 transmits an E-mail to the portable telephone 200 stating that it is impossible to convert, i.e., the E-mail cannot be outputted as an image. At the step S316, a search is conducted on the attachment file and the attachment file, which is temporarily stored, is retrieved based on the content of the reply mail "Re: c."

At the step S317, the attachment file retrieved from the storage is converted into a format that can be image-outputted by the selected image output device. More specifically, if the facsimile device is selected as the image output device, the attachment file will be developed into bitmap data so that it can be converted into a format suitable for facsimile transmission. If the printer is selected as the image output device, the attachment file will be developed and described by page descriptive language (PDL).

At the step S318, the data that corresponds to the attachment file is transmitted to the image output device selected at the step S317.

At the step S319, the name of the image output device to which the data that corresponds to the attachment file, the place of its installation, and the name of the shop it is installed, etc., are transmitted to the portable telephone 200.

As can be seen from the above, it is not necessary according to the present embodiment to reregister the image output device to which the attachment file portion is to be outputted each time when the user carrying the portable telephone moves. In other words, a new image output device will be automatically selected where the attachment file portion is outputted as an image, when the destination of the E-mail moves. Therefore, the user can confirm the content of the attachment file at an image output device such as a facsimile located close to where the user is. Even if the user is out of office and does not know the shop where an applicable image output device is installed, an image output device can be searched automatically based on the location information of the portable telephone, so that the user's burden of finding an output device is alleviated.

As it is shown in FIG. 11, although it is described in the above description that the location information of the portable telephone is calculated based on the relation between the portable telephone and the base station, and the location information is obtained by the mail server, the invention is not limited to this case. For example, it is possible to acquire the location information of the portable telephone by other constitution shown in FIG. 14 and FIG. 15.

FIG. 14 shows an example constitution of a case where the location information of the portable telephone is acquired based on the GPS (global positioning system) provided on the portable telephone 210. The GPS 210 calculates the location information of the portable telephone 200 by receiving radio waves from satellites. The calculated location information is transmitted to the mail server 100 via the base station 900. Therefore, the mail server 100 can acquire the location information of the portable telephone 200 by means of the constitution shown in FIG. 14.

Figure 15:
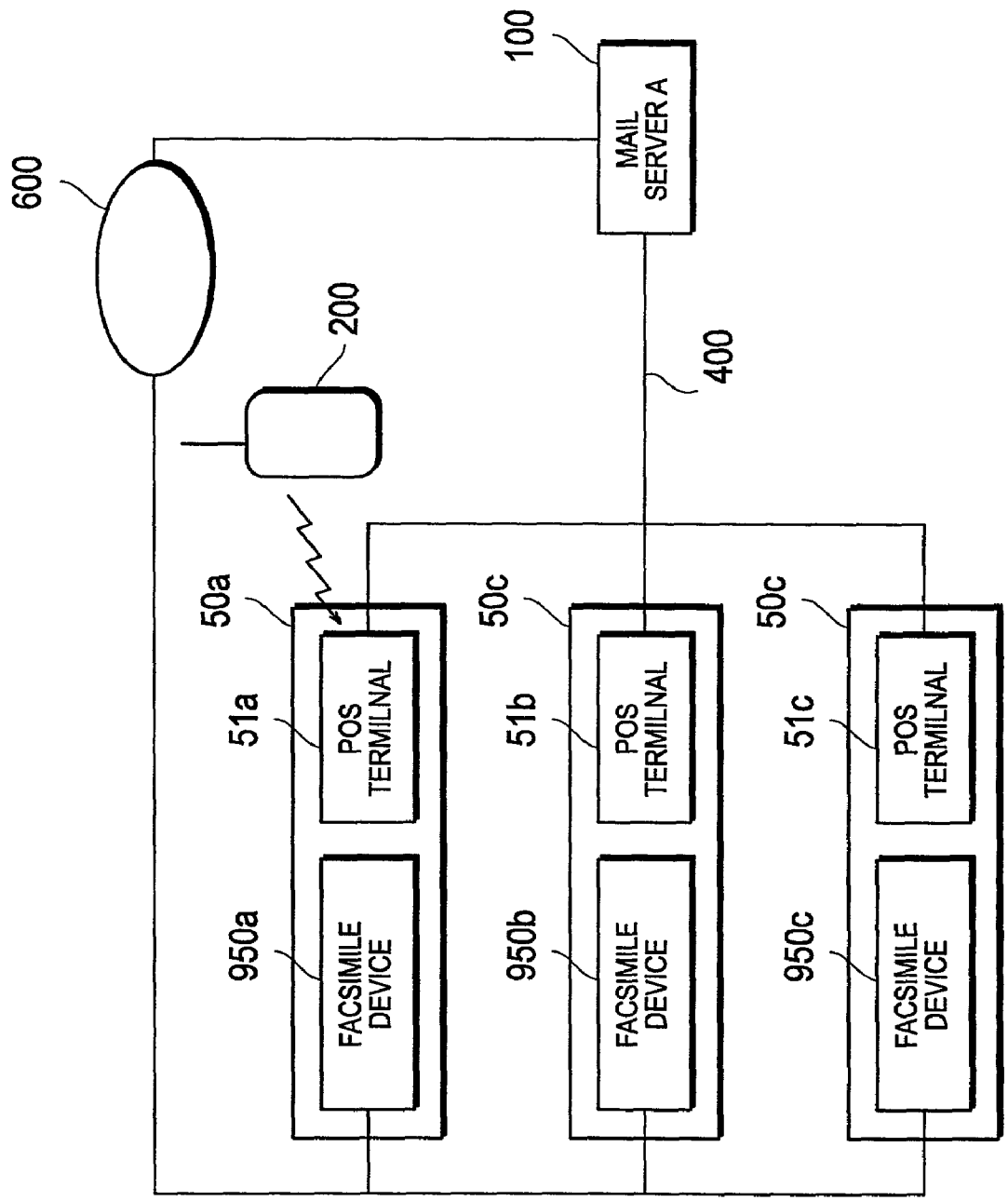
FIG. 15 is a diagram showing an example constitution for obtaining the location information of a portable telephone by means of the portable telephone's communications with other terminal units using infrared rays and radio waves.

FIG. 15 is an example constitution of a case where the location information of the portable telephone is acquired as the portable telephone 200 communicating with other terminal equipment by means of infrared rays and radio waves.

Shops 50*a*, 50*b*, and 50*c* are equipped with POS terminals 51*a* through 51*c* respectively. The shops 50*a*, 50*b*, and 50*c* can also be equipped with image output devices such as facsimile devices 950*a* through 950*c* respectively. The portable telephone 200 is capable of wireless communication with each POS terminals 51*a* through 51*c*. The communication range is less than 50 meters. The POS terminals 51*a* through 51*c* receive the signal outputted by the portable telephone 200. The POS terminals 51*a* through 51*c* are connected to the mail server 100 via the network 400. The locations of the POS terminals 51*a* through 51*c* are preregistered.

Therefore, when the portable telephone 200 is close to the shop 50*a*, the POS terminal 51*a* receives radio communications from the portable telephone 200. As a result, the mail server 100 receives a notice via the network 400 that the POS terminal 51*a* has received wireless communications from the portable telephone 200. Since the location information of the POS terminal 51*a* is registered in advance, it is estimated that the portable telephone 200 is close to the POS terminal 51*a*. Therefore, the mail server 100 can acquired the location information of the telephone set 200 indirectly by means of the constitution shown in FIG. 15.

The equipment that exchanges wireless communication with the portable telephone 200 is not limited to the POS terminal, and can be any equipment whose location is known. If the portable telephone 200 is a PHS® set, it is possible to conduct wireless communications as shown in FIG. 15 using the transceiver function of the PHS®. It is possible to use the IrDA (Infrared Data Association) system that conducts communication using infrared rays, or the Bluetooth® system that uses the frequency hopping type spread spectrum communication for the wireless communications shown in FIG. 15.

Although it was described in the above that the location information of various image output devices such as printers and facsimiles are registered in advance as shown FIG. 12, the invention is not limited to it. It is possible to acquire the service content that each image output device can supply, i.e., the aforementioned service information can be acquired by mean so using the architecture of the Salutation® that automatically detects and controls each image output device via the Internet and LANs, or the Jetsend®, which is the communication technology between peripheral equipments. Therefore, it is possible to acquire information such as whether the data that corresponds to the attachment file portion can be outputted by each image output device by applying the network technology such as the architecture of the Salutation®or the Jetsend®.

The portable telephone 200 can acquire the location information and the service information of image output devices located nearby. For example, if the portable telephone 200 is close to various equipment such as POS terminals, it can communicate with the equipment using the aforementioned Bluetooth® system, etc. Consequently, it acquires the location information and the service information of image output devices located nearby. The portable telephone 200 immediately transmits the acquired information to the E-mail server 100. In this case, it is not necessary for the E-mail server to store a table that has the location information and the service information as shown in FIG. 12.

While the E-mail sending/receiving process between the E-mail server 100 and the portable telephone is shown in FIG. 5, the invention is not limited to such a case. Variation processes such as those shown in FIG. 16 through FIG. 18 can be used instead of the process shown in FIG. 5.

(Variation 1)

Figure 16:
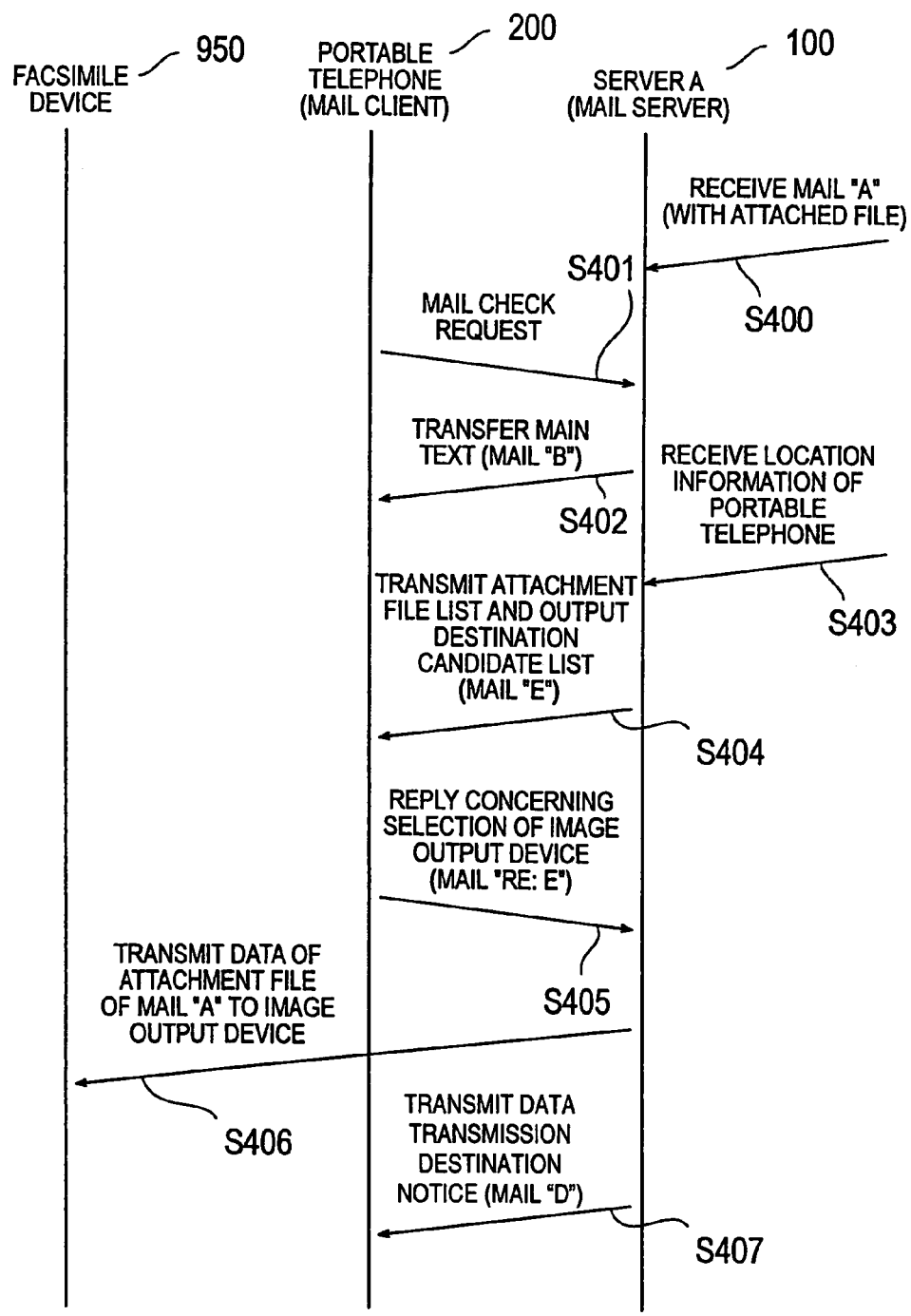
FIG. 16 is a sequence chart showing a first variation of the system containing the E-mail server.

FIG. 16 is a sequence chart showing a first variation of the system containing the E-mail server. The processes in the steps S400 through S403 are similar to those in the case shown in FIG. 5.

At the step S404, multiple image output devices within a prescribed distance of the portable telephone 200 are searched based on the location information of the portable telephone 200 acquired at the step S403. An output destination candidate list is prepared based on the information acquired through the search. The mail server 100 transmits the list of attachment files removed from the E-mail and a receipt notice E-mail "e" to the portable telephone 200.

At the step S405, the portable telephone 200 transmits the selection instruction of the image output device as the reply mail "Re: e" in response to the receipt notice E-mail "e."

At the step S406, the data corresponding to the attachment file is transmitted to the selected image output device. At the step S407, an E-mail "d" that notifies of the image output device to which the data is transmitted, is transmitted to the portable telephone 200. The image output device, to which the data is transmitted, has already been confirmed at the step S405, the process of the step S407 can be omitted.

According to the constitution of the first variation shown in FIG. 16, it is possible to announce multiple image output devices that are candidates of the image output destination, before the content of the attachment file is outputted to an image output device. Therefore, the user of the portable telephone can select an image output device, which may not be the closest in terms of the physical distance, but which can be reached within a shortest time due to traffic situations.

(Variation 2)

Figure 17:
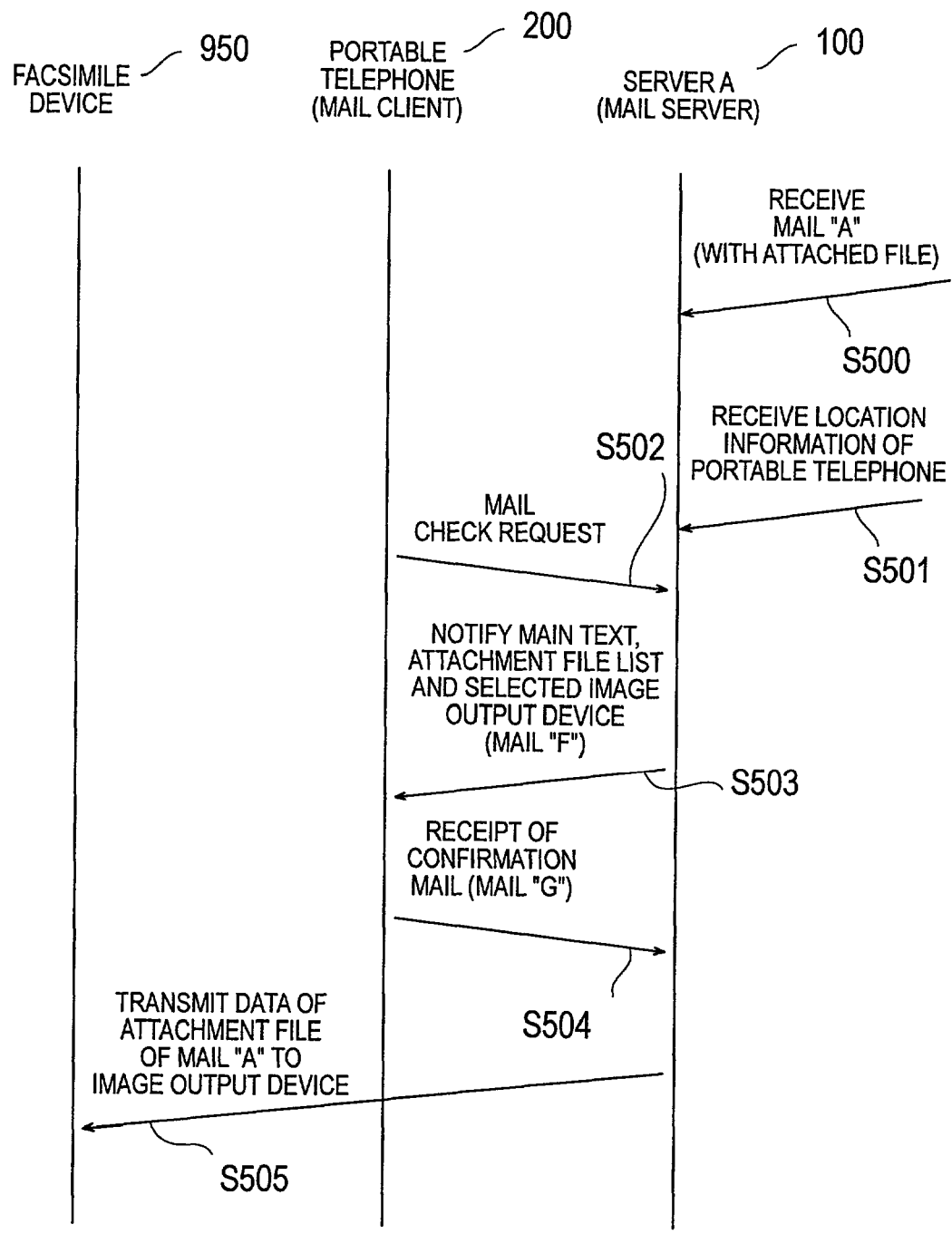
FIG. 17 is a sequence chart showing a second variation of the system containing the E-mail server.

FIG. 17 is a sequence chart showing a second variation of the system containing the E-mail server. The process in the step S500 is the same as in the case shown in FIG. 5.

At the step S501, the location information of the portable telephone 200 is acquired prior to the receiving of the mail check request (step S502) from the portable telephone 200. At the step S503, the mail server 100 transmits a receipt notice E-mail "f" to the portable telephone 200. The receipt notice E-mail "f" contains the list of attachment files that are removed and the information about the image output device, which is the output destination, added to the main text portion of the E-mail "a" received at the step S500.

At the step S504, the mail server 100 receives the notice from the portable telephone 200 acknowledging its approval of the image output device that was notified of at the step S503. Specifically, the approval becomes official when the server receives a confirmation E-mail "g" from the portable telephone 200. The confirmation E-mail "g" can be replaced by a reply mail "Re: f," which is a response to the E-mail "f." At the step S505, the data that corresponds to the attachment file is transmitted to the approved image output device.

According to the variation shown in FIG. 17, the main text of the E-mail "a", the attachment file list, and the information concerning the image output device to which the data corresponding to the E-mail is transmitted are all transmitted together, the frequency of transmissions of the receipt notice E-mail from the mail server 100 can be reduced, thus alleviating the burden of network traffic.

(Variation 3)

Figure 18:
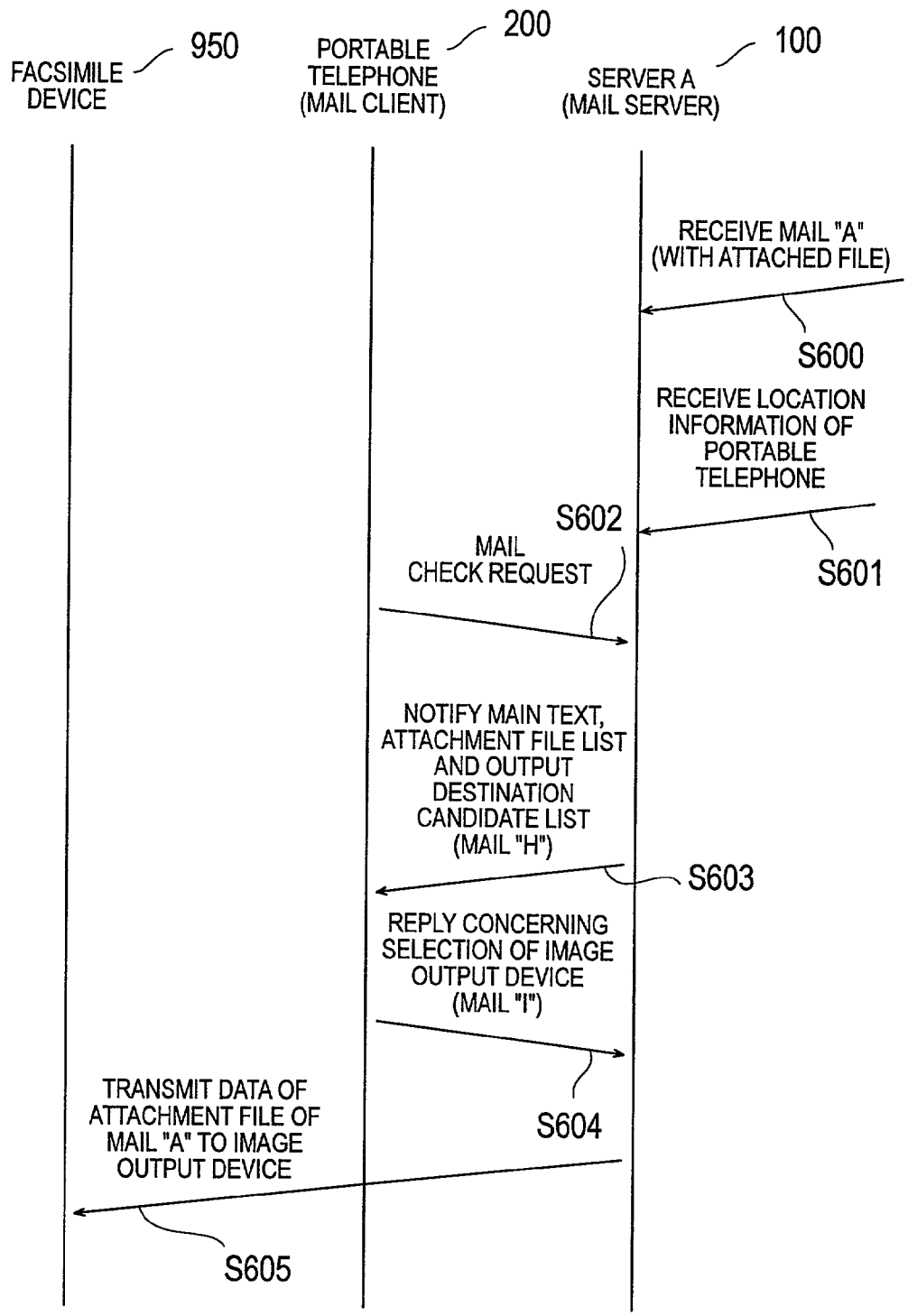
FIG. 18 is a sequence chart showing a third variation of the system containing the E-mail server.

FIG. 18 is a sequence chart showing a third variation of the system containing the E-mail server. The processes in the steps S600 through S602 are similar to those in the case shown in FIG. 17.

At the step S603, the mail server 100 transmits a receipt notice E-mail "h", to the portable telephone 200. The receipt notice E-mail "h" contains the list of attachment files that are removed and the information about the image output device, which is the output destination, added to the main text portion of the E-mail "a" received at the step S600. The processes in the steps S604 and S605 are similar to those of the steps S405 and S406 shown in FIG. 16.

According to the variation shown in FIG. 18, the main text of the E-mail "a," the attachment file list, and the information concerning the image output device to which the data corresponding to the E-mail is transmitted are all transmitted together, the frequency of transmissions of the receipt notice E-mail from the mail server 100 can be reduced, thus alleviating the burden of network traffic as in the case shown in FIG. 17.

(Variation 4)

The cases described in the above referring to FIG. 5, FIG. 16 through FIG. 18 indicate the applications of the invention to the mail server 100 that exchanges E-mail directly with the portable telephone 200. However, the invention is not limited to this case. As shown in this fourth variation, the invention can be applied to the mail server 700 (refer to FIG. 1) that does not exchange E-mail directly with the portable telephone. The E-mail control device of this invention, i.e., the mail server 700 can be a device that exchanges E-mail with the portable telephone via other devices.

Figure 19:
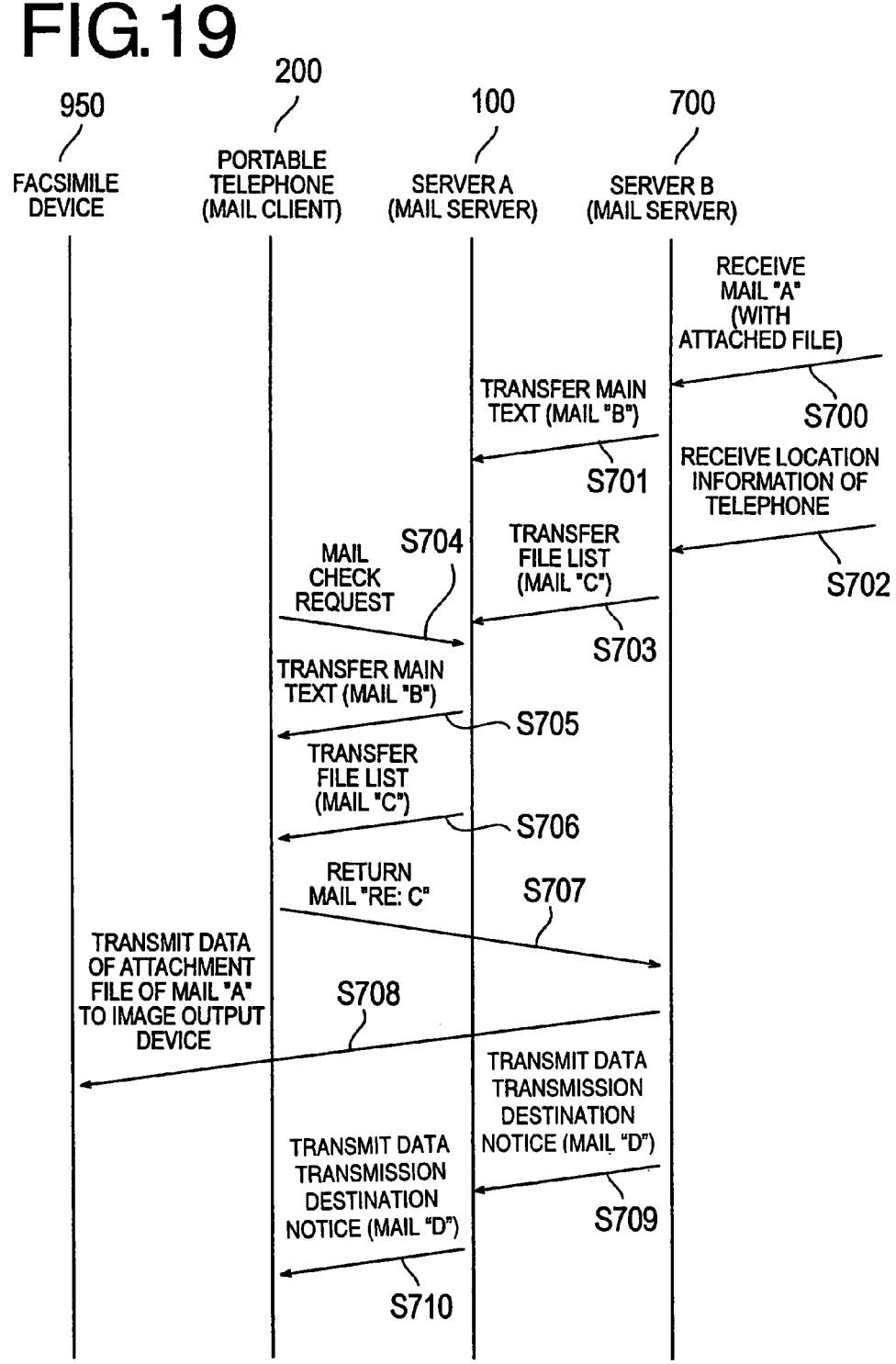
FIG. 19 is a sequence chart showing a fourth variation of the system containing the E-mail server.

FIG. 19 is a sequence chart that shows the fourth variation of the system that includes the E-mail server.

At the step S700, the E-mail "a" is transmitted to the mail server 700. At the step S701, the receipt notice E-mail "b" that corresponds to the main text portion of the mail that is obtained by removing the attachment file portion from the E-mail "a" is transmitted to the mail server 100. At the step S702, the location information of the portable telephone 200 is obtained. An image output device is selected, as a device for outputting the data corresponding to the attachment file, based on the location information of the portable telephone 200.

At the step S703, the mail server 700 prepares the receipt notice E-mail "c" containing the list of attachment files that were removed a the step S701, and the mail server 700 transmits it to the mail server 100. At the step S704, the mail server 100 of the portable telephone 200 receives the mail check request from the portable telephone 200.

At the step S705, the mail server 100 transmits the receipt notice E-mail "b," which has been received at the step S701, to the portable telephone 200. At the step S706, the mail server 100 transmits the receipt notice E-mail "c," which has been received at the step S703, to the portable telephone 200. The processes of the steps S705 and S706 can be easily executed by the transfer function, which the normal mail server is equipped with.

At the step S707, the reply mail "Re: c" is returned by the portable telephone 200. Since the receipt notice E-mail "c" was transmitted by the mail server 700, the reply mail "Re: c" is returned to the mail server 700 according to the normal reply mail process of a mail server.

At the step S708, the mail server 700 transmits the data corresponding to the attachment file to the image output device selected at the step S702. At the step S709, the mail server 700 transmits the E-mail "d" to the mail server 100.

The E-mail "d" notifies of the image output device, to which the data corresponding to the attached file is transmitted. At the step S710, the mail server 100 transmits the E-mail "d" to the portable telephone 200.

Thus, the advantages of the invention can be appreciated by simply using the E-mail transfer function without having to change the system of the mail server 100 for portable telephones.

Embodiment 2

It is preferable from the user's standpoint to have the E-mail server obtain the location information of the portable telephone, which is the E-mail's destination, automatically select an image output device located close to the portable telephone based on the acquired location information as shown in the first embodiment. However, it is also possible to have the portable telephone transmit the telephone number of a facsimile device, which is an image output device, and have the data corresponding to the attachment file portion be transmitted to the facsimile device corresponding to the telephone number transmitted by the E-mail.

The mail server of the second embodiment is a mail server that receives an instruction for specifying one of the image output devices by E-mail from the portable telephone. Since the network environment wherein the mail server of this embodiment operates, and the general constitution of the mail server are similar to those shown in FIG. 1 and FIG. 2, detail descriptions will not be repeated here and the same member identifying numbers is used.

Figure 20:
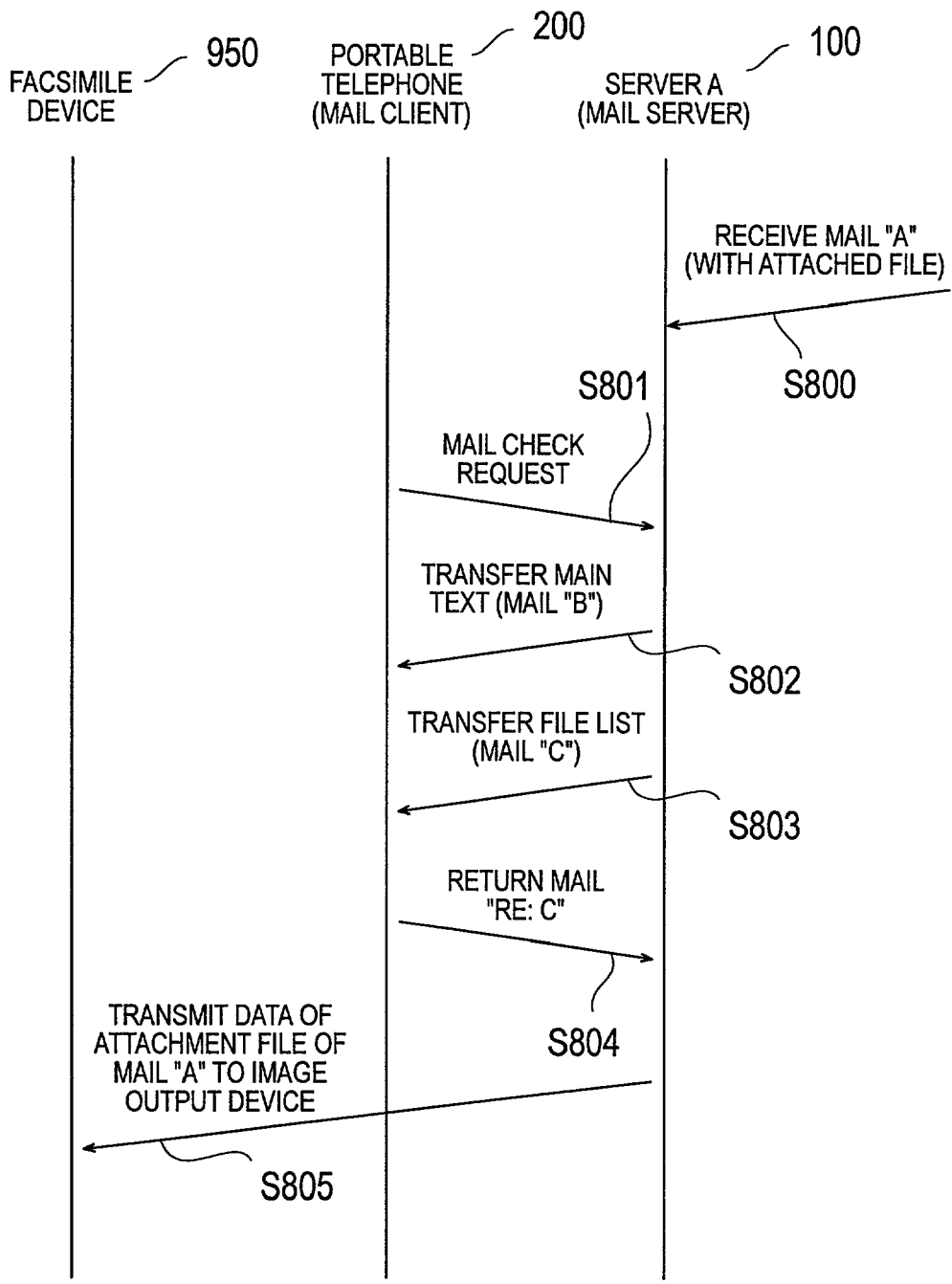
FIG. 20 is a sequence chart showing the operation according to the system containing the E-mail server of the second embodiment.

FIG. 20 is a sequence chart showing the process content of the E-mail server corresponding to this embodiment. The steps S800 through S803 are similar to the S200 through S202 as well as S204 shown in FIG. 5 respectively.

At the step S804, the mail server 100 receives from the portable telephone 200 the reply mail "Re: c," which is a reply to the receipt notice E-mail "c" transmitted by the mail server 100. The reply mail "Re: c" in this embodiment is an E-mail that contains an instruction to specify one of the image output devices. Specifically, the reply mail "Re: c" has a telephone number (facsimile number) 45 written as shown in FIG. 21.

At the step S805, the mail server 100 analyzes the reply mail "Re: c" and extracts the portion of the telephone number 45. The mail server 100 converts the data format of the attached file portion into an image format, and sends it by facsimile transmission via the telephone network 600 to the facsimile device 950 corresponding to the telephone number obtained by the step S804.

It is also possible in this embodiment for the user to specify an image output device easily while the user is out of office without having to return to the location where the mail server 100 is installed and reregistering the telephone number of the image output device, by which a portion of the E-mail is to be outputted. Therefore, the user of the portable telephone 200 can specify the image output device nearby to output the attachment file to reduce the workload of the user.

Although the first and second preferred embodiments of the invention are described in the above, the present invention is not limited to these embodiments, various modifications are possible within the spirit of the invention.

The image output device to which the data corresponding to the attachment file portion is transmitted is not limited to a facsimile machine, but also can be a printer 960 and a display system 970. Also, if the attachment file contains color graphics, it is possible to use color printers or color displays as the image output device.

If the selected image output device is a facsimile device, a facsimile device is specified according to a telephone number and the data corresponding to the attachment file portion will be sent to it. If the selected image device is a printer or a display system, a printer or a display system is specified according to the IP address, and the data corresponding to the attachment file portion will be transmitted to it.

It is preferable to convert the data to a format that can be outputted by the selected image output device when transmitting the data corresponding to the attachment a file portion. However, the invention is not limited to this case. It is possible to transmit the data corresponding to the attachment file portion without converting the format to the image output device. In this case, the data corresponding to the attachment file portion can be converted at the image output device to the format that can be outputted.

Although a portable telephone is used as an example of the destination of the E-mail, the invention is not limited to such as case. For example, the destination does not have to be a portable telephone as long as it is constituted to be able to receive E-mail and the location position can be detectable.

Furthermore, although the case of transmitting to the image output device only the data corresponding to the attachment file portion of E-mail has been described. However, the invention is not limited to such a case. For example, the entire E-mail data, in other words, both the attachment file portion and the main text of E-mail can be transmitted to the image output device. In other words, the data received by the receiving means of E-mail addressed to a portable terminal unit can be transmitted to an image output device selected according to the location information of the portable terminal unit regardless of whether it is the entire or a portion of the E-mail. The process of transmitting the entire E-mail to the selected image output device is particularly useful when the volume of the text portion of the E-mail is large so that it is difficult to receive or store at the portable terminal, or when it is desired to output as an image at the image output device because the display provided at the portable terminal unit cannot display the entire text portion.

It is obvious for a person skilled in the art to implement the electronic mail processing methods shown in FIG. 5 through FIG. 7 as well as FIG. 16 through FIG. 19 referring to the description in the above. Further, it is possible to realize the constitution of the apparatus for controlling electronic mail of the invention by installing a program containing the procedures for processing electronic mail shown in these drawings. The program can be provided by computer readable memory media such as flexible disks, CD-ROMs, optical magnetic disks, hard disks, and RAMs.

What is claimed is:

1. An E-mail controlling apparatus comprising:
    an E-mail receiving device receiving E-mail including a main text portion and an attachment file portion and being addressed to a portable terminal unit;
    an E-mail preparing device preparing receipt notice E-mail by removing the attachment file portion from the received E-mail;
    an E-mail transmitting device transmitting to said portable terminal unit the receipt notice E-mail prepared by said E-mail preparing device and an E-mail identifying multiple prospective image output devices;
    an instruction receiving device receiving an E-mail including an instruction for specifying one of multiple image output devices;
    a converting device converting the attachment file portion into data of a format acceptable to the image output device; and a data transmitting device transmitting said data after the conversion to the image output device specified by said instruction.

2. An E-mail controlling system comprising:
- an E-mail receiving device receiving E-mail addressed to a portable terminal unit;
- an E-mail preparing device preparing receipt notice E-mail based on the E-mail received by said E-mail receiving device;
- an E-mail transmitting device transmitting the receipt notice E-mail prepared by said E-mail preparing device to said portable terminal unit;
- a location information acquiring device acquiring location information of said portable terminal unit;
- a selecting device selecting one of multiple image output devices on the basis of the location information of said portable terminal unit acquired by said location information acquiring device;
- a notifying device that sends an E-mail to said portable terminal unit containing a notification of the image output device selected by said selecting device; and
- a data transmitting device transmitting at least a portion of the data of the E-mail received by the E-mail receiving device to the image output device selected by the selecting device.

3. The E-mail controlling system according to claim 2 wherein said E-mail preparing device prepares the receipt notice E-mail based on the content of a main text portion of the E-mail received by the E-mail receiving device.

4. The E-mail controlling system according to claim 2 wherein said E-mail preparing device prepares the receipt notice E-mail by removing an attachment file portion of the E-mail received by the E-mail receiving device.

5. The E-mail controlling system according to claim 4 wherein said data transmitting device transmits data corresponding to the attachment file portion of the E-mail received by the E-mail receiving device.

6. The E-mail controlling system according to claim 5 further comprising a converting device converting the attachment file portion of the E-mail received by the E-mail receiving device into data of a format acceptable to the image output device; wherein,
said data transmitting device transmits the data after the conversion by said converting device.

7. The E-mail controlling system according to claim 2 wherein said data transmitting device transmits data corresponding to an attachment file portion of the E-mail received by the E-mail receiving device.

8. The E-mail controlling system according to claim 2 wherein said data transmitting device transmits the data corresponding to the entire portion of the E-mail received by the E-mail receiving device.

9. The E-mail controlling system according to claim 2 wherein said selecting device selects image output devices within a certain distance from said portable terminal unit.

10. The E-mail controlling system according to claim 2 wherein said selecting device selects an image output device closest to said portable terminal unit.

11. The E-mail controlling system according to claim 2 wherein said selecting device includes:
- a memory device storing location information of multiple image output devices; and
- a search device searching image output devices suitable for the location information acquired by said location information acquiring device from multiple image output devices whose location information is stored in said memory device.

12. The E-mail controlling system according to claim 2 wherein said selecting device includes:
- a list preparing device preparing a list of image output devices within a certain distance from said portable terminal unit;
- a list transmitting device transmitting the list prepared by said list preparing device to said portable terminal unit; and
- a selection instruction receiving device receiving an instruction specifying one of the image output devices in the list.

13. The E-mail controlling system according to claim 2 wherein said data transmitting device transmits the data to an image output device specified by an IP address.

14. The E-mail controlling system according to claim 2 wherein said data transmitting device transmits the data to an image output device specified by a telephone number.

15. The E-mail controlling system according to claim 2 wherein communication between said E-mail transmitting device and said portable terminal unit is conducted indirectly via another E-mail controlling system.

16. The E-mail controlling system according to claim 2 wherein said data transmitting device transmits at least a portion of the data of the E-mail received by the E-mail receiving device to a display selected by the selecting device.

17. The E-mail controlling system according to claim 2 wherein said data transmitting device transmits at least a portion of the data of the E-mail received by the E-mail receiving device to a printer.

18. An E-mail controlling system comprising:
- an E-mail receiving device receiving E-mail including a main text portion and an attachment file portion and being addressed to a portable terminal unit;
- an E-mail preparing device preparing receipt notice E-mail by removing the attachment file portion from the received E-mail;
- an E-mail transmitting device transmitting to said portable terminal unit the receipt notice E-mail prepared by said E-mail preparing device and an E-mail identifying multiple prospective image output devices;
- an instruction receiving device receiving an E-mail including an instruction specifying one of multiple image output devices;
- a converting device converting the attachment file portion into data of a format acceptable to the image output device; and
- a data transmitting device transmitting said data after the conversion to the image output device specified by said instruction.

19. The e-mail controlling system of claim 2, wherein said selecting device automatically selects one of said multiple image devices on the basis of the location information of said portable terminal unit acquired by said location information acquiring device.

20. An E-mail controlling system comprising: an E-mail controlling apparatus; a portable terminal unit receiving E-mail from said E-mail controlling apparatus; and an image output device capable of receiving data from said E-mail controlling apparatus;
said E-mail controlling apparatus including: an E-mail receiving device receiving E-mail addressed to said portable terminal unit; an E-mail preparing device preparing receipt notice E-mail based on the E-mail received by said E-mail receiving device; an E-mail transmitting device transmitting the receipt notice E-mail prepared by said E-mail preparing device to said portable terminal unit; a location information acquiring device acquiring location information of said portable terminal unit; a selecting device selecting one of multiple image output devices on the basis of the location information of said portable terminal unit acquired by said position acquiring device; a notifying device that sends an E-mail to said portable terminal unit containing a notification of the image output device selected by said selecting device; and a data transmitting device transmitting at least a portion of the data of the E-mail received by the E-mail receiving device to the image output device selected by the selecting device;

said image output device outputting the content of the E-mail based on the data received from said E-mail controlling apparatus.

21. An E-mail processing method comprising the steps of:
receiving E-mail addressed to a certain destination;
preparing receipt notice E-mail based on the received E-mail;
transmitting said receipt notice E-mail to said destination;
acquiring location information of said destination;
selecting one of multiple image output devices on the basis of the location information of said destination acquired;
sending an E-mail to said destination containing a notification of the selected image output device; and
transmitting at least a portion of the data of the received E-mail to the selected image output device.

22. An E-mail processing method comprising the steps of:
receiving E-mail addressed to a portable terminal unit;
preparing receipt notice E-mail based on the received E-mail;
transmitting said receipt notice E-mail to said portable terminal unit;
acquiring location information of said portable terminal unit;
selecting one of multiple image output devices on the basis of the acquired location information of said portable terminal unit;
sending an E-mail to said portable terminal unit containing a notification of the selected image output device; and
transmitting at least a portion of the data of the received E-mail to the selected image output device.

23. A computer-readable medium having a plurality of sequences of instructions stored thereon including sequences of instructions which are executed by one or more processors to perform the steps of:
receiving E-mail addressed to a certain destination;
preparing receipt notice E-mail based on the received E-mail;
transmitting said receipt notice E-mail to said destination;
acquiring location information of said destination;
selecting one of multiple image output devices on the basis of the location information of said destination acquired;
sending an E-mail to said destination containing a notification of the selected image output device; and
transmitting at least a portion of the data of the received E-mail to the selected image output device.

24. A computer-readable medium having a plurality of sequences of instructions stored thereon including sequences of instructions which are executed by one or more processors to perform the steps of:
receiving E-mail addressed to a portable terminal unit;
preparing receipt notice E-mail based on the received E-mail ;
transmitting said receipt notice E-mail to said portable terminal unit;
acquiring location information of said portable terminal unit;
selecting one of multiple image output devices on the basis of the acquired location information of said portable terminal unit;
sending an E-mail to said portable terminal unit containing a notification of the selected image output device; and
transmitting at least a portion of the data of the received E-mail to the selected image output device.

25. A program product comprising:
a computer-readable medium; and
computer program contained on said computer-readable medium for causing a computer to execute a process comprising the steps of:
receiving E-mail addressed to a certain destination;
preparing receipt notice E-mail based on the received E-mail;
transmitting said receipt notice E-mail to said destination;
acquiring location information of said destination;
selecting one of multiple image output devices on the basis of the location information of said destination acquired;
sending an E-mail to said destination containing a notification of the selected image output device; and
transmitting at least a portion of the data of the received E-mail to the selected image output device.

26. A program product comprising:
a computer-readable medium; and
computer program contained on said computer-readable medium for causing a computer to execute a process comprising the steps of:
receiving E-mail addressed to a portable terminal unit;
preparing receipt notice E-mail based on the received E-mail;
transmitting said receipt notice E-mail to said portable terminal unit;
acquiring location information of said portable terminal unit;
selecting one of multiple image output devices on the basis of the acquired location information of said portable terminal unit;
sending an E-mail to said portable terminal unit containing a notification of the selected image output device; and
transmitting at least a portion of the data of the received E-mail to the selected image output device.

* * * * *